(12) United States Patent
Kim et al.

(10) Patent No.: US 11,526,439 B2
(45) Date of Patent: Dec. 13, 2022

(54) STORAGE DEVICE AND OPERATING METHOD THEREOF

(71) Applicant: SK hynix Inc., Gyeonggi-do (KR)

(72) Inventors: Jin Woo Kim, Gyeonggi-do (KR); Jin Woong Kim, Gyeonggi-do (KR); Hui Jae Yu, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/149,366

(22) Filed: Jan. 14, 2021

(65) Prior Publication Data

US 2021/0365367 A1     Nov. 25, 2021

(30) Foreign Application Priority Data

May 22, 2020   (KR) .......................... 10-2020-0061334

(51) Int. Cl.
  *G06F 12/02*     (2006.01)
  *G06F 12/1009*   (2016.01)
  *G06F 3/06*      (2006.01)

(52) U.S. Cl.
  CPC .......... *G06F 12/0276* (2013.01); *G06F 3/064* (2013.01); *G06F 3/0611* (2013.01); *G06F 3/0679* (2013.01); *G06F 12/1009* (2013.01)

(58) Field of Classification Search
  CPC .. G06F 12/1009; G06F 12/0276; G06F 3/064; G06F 3/0611; G06F 3/0679
  USPC ........................................................ 711/159
  See application file for complete search history.

(56) References Cited

U.S. PATENT DOCUMENTS

| | | | |
|---|---|---|---|
| 2016/0267004 A1* | 9/2016 | Perlstein ............. | G06F 12/0246 |
| 2018/0018091 A1* | 1/2018 | Shin ...................... | G06F 3/0665 |
| 2020/0293441 A1* | 9/2020 | Lin ....................... | G06F 12/0292 |

FOREIGN PATENT DOCUMENTS

| KR | 10-2019-0044798 | 5/2019 |
|---|---|---|
| KR | 10-2019-0127980 | 11/2019 |

* cited by examiner

*Primary Examiner* — Hua J Song
(74) *Attorney, Agent, or Firm* — IP & T Group LLP (57) ABSTRACT

A storage device includes a nonvolatile memory including a plurality of first blocks having memory cells each configured to store one bit of data and a plurality of second blocks having memory cells each configured to multiple bits of data; and a controller configured to determine whether or not a number of use-completed second blocks, each of which has a first threshold number or less of valid pages, among use-completed second blocks of the plurality of second blocks, is equal to or larger than a second threshold number and to select, according to a determination result, a victim block on which garbage collection is to be performed among used-completed first blocks of the plurality of first blocks or the use-completed second blocks each having the first threshold number or less of valid pages.

20 Claims, 10 Drawing Sheets

FTL

STORAGE DEVICE AND OPERATING METHOD THEREOF

CROSS-REFERENCE TO RELATED APPLICATION

The present application claims priority under 35 U.S.C. § 119(a) to Korean Application Number 10-2020-0061334, filed on May 22, 2020, in the Korean Intellectual Property Office, which is incorporated herein by reference in its entirety.

BACKGROUND

1. Technical Field

Various embodiments generally relate to a storage device, and more particularly, to a storage device and an operating method thereof.

2. Related Art

In recent years, the paradigm for computer environments has shifted to ubiquitous computing in which computer systems may be used anytime and anywhere. As a result, the use of portable electronic apparatuses such as mobile phones, digital cameras, and laptop computers has been increasing rapidly. Generally, portable electronic apparatuses use data storage devices that employ memory devices. Data storage devices may be used to store data used in the portable electronic apparatuses.

Data storage devices using memory devices have no mechanical driving units and thus exhibit good stability and endurance, fast information access rates, and low power consumption. Such data storage devices include a universal serial bus (USB) memory device, a memory card having various interfaces, a universal flash storage (UFS) device, a solid state drive (SSD), and the like.

SUMMARY

Embodiments are provided to technology capable of preventing performance from being deteriorated and improving spatial efficiency and an operating method thereof.

In an embodiment of the present disclosure, a storage device may include: a nonvolatile memory including a plurality of first blocks having memory cells each configured to store one bit of data and a plurality of second blocks having memory cells each configured to multiple bits of data; and a controller configured to determine whether or not a number of use-completed second blocks, each of which has a first threshold number or less of valid pages, among use-completed second blocks of the plurality of second blocks, is equal to or larger than a second threshold number and to select, according to a determination result, a victim block on which garbage collection is to be performed among used-completed first blocks of the plurality of first blocks or the use-completed second blocks each having the first threshold number or less of valid pages.

In an embodiment of the present disclosure, an operating method of a storage device which includes a nonvolatile memory including a plurality of first blocks having memory cells each configured to store one bit of data and a plurality of second blocks having memory cells each configured to store multiple bits of data and a controller configured to control the nonvolatile memory, the method may include: determining whether or not a garbage collection trigger condition for the nonvolatile memory is satisfied; determining whether or not a number of use-completed second blocks, each of which has a first threshold number or less of valid pages, among use-completed second blocks of the plurality of second blocks, is equal to or larger than a second threshold number; and selecting, according to a determination result for the number of use-completed second blocks, a victim block on which garbage collection is to be performed among used-completed first blocks of the plurality of first blocks or the use-completed second blocks each having the first threshold number or less of valid pages.

In an embodiment of the present disclosure, a storage device may include: a nonvolatile memory including a plurality of single-level cell (SLC) blocks and a plurality of extra-level cell (XLC) blocks; and a collector configured to select a victim block on which garbage collection is to be performed among the plurality of SLC blocks or among the plurality of XLC blocks, based on a number of use-completed XLC blocks each having K or less valid pages among use-completed XLC blocks of the plurality of XLC blocks, wherein K is a natural number of 1 or more.

In an embodiment of the present disclosure, a storage device may include: a nonvolatile memory including a plurality of first blocks having memory cells each configured to store one bit of data and a plurality of second blocks having memory cells each configured to store multiple bits of data; a volatile memory configured to store valid pages in use-completed second blocks each of which has a first threshold number or less of valid pages, among the plurality of second blocks; and a controller configured to determine whether or not the number of use-completed second blocks each having the first threshold number or less of valid pages is greater than or equal to a second threshold number and select, according to a determination result, a victim block on which a garbage collection is to be performed among used-completed first blocks of the plurality of first blocks or the use-completed second blocks each having the first threshold number or less of valid pages.

According to embodiments, write speed may be increased by performing garbage collection (that is, migration) on the SLC block until the number of XLC blocks having a valid page equal to or less than a determined value becomes a determined value or more and when the number of XLC blocks having the valid page equal to or less than the determined value is the determined value or more, the number of free blocks may be maintained at a constant level by performing garbage collection on the XLC block. According to the present embodiments, the deterioration of the write performance in the storage device may be prevented and simultaneously the free blocks of a constant number or more may be continuously maintained.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present teachings are described in detail with reference to the accompanying drawings. The drawings are block and schematic illustrations of various embodiments (and intermediate structures). The present invention, however, may be implemented in other forms and ways, as those skilled in the art will recognize in view of the present disclosure. Thus, the present invention is not limited by or to any of the disclosed embodiments, nor to any particular detail herein. Rather, the present invention encompasses all variations commensurate with the teachings herein and within the scope of the claims.

The present teachings are provided in the context of specific embodiments. However, the present teachings extend beyond the disclosed embodiments. As those skilled in the art will recognize, the present invention may be embodied differently without departing from the principles and spirit of the present teachings. Also, throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
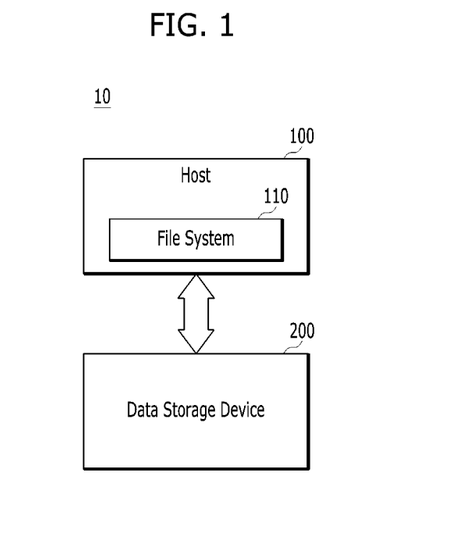
FIG. 1 is a diagram illustrating an electronic device according to an embodiment of the present disclosure.

FIG. 1 is a diagram illustrating a configuration of an electronic device 10 according to an embodiment.

Referring to FIG. 1, the electronic device 10 according to an embodiment may include a host 100 and a storage device 200.

The host 100 may be a device such as such as a mobile phone, an MP3 player, a laptop computer, a desktop computer, a game player, a television (TV), and/or an in-vehicle infotainment system. The host 100 may include a file system 110. Although not shown in FIG. 1, the host 100 may include a processor (for example, central processing unit (CPU)) and a driver. The processor may control overall operation of the host 100 and the driver may drive the storage device 200 according to control of the processor. In an embodiment, the driver of the host 100 may include an application (not shown), the file system 110, a host memory (not shown), and the like.

The application may refer to application program and may be software executed on an operation system (OS). The application may process data in response to user input. For example, the application may process user data in response to user input and transfer a command for storing the processed user data in a nonvolatile memory (see 210 of FIG. 2) of the storage device 200 to the file system 110.

The file system 110 may allocate a logical block address (LBA) in which the user data is to be stored in response to the command transferred from the application. In an embodiment, the file system 110 may be a flash-friendly file system (F2FS), an extended file system 4 (EXT4), or another type of file system similar thereto, but the present invention is not limited to any specific type of file system.

The host memory may temporarily store data to be written in the nonvolatile memory 210 of the storage device 200 or data read out from the nonvolatile memory 210 of the storage device 200. The host memory may be used as a working memory configured to drive (or execute) the application, the file system 110, and the like.

Referring back to FIG. 1, the storage device 200 may store data to be accessed by the host 100. The storage device 200 may refer to a data storage device or a memory system.

The storage device 200 may include any of various types of storage devices according to an interface protocol coupled to the host 100. For example, the storage device 200 may include any of various types of storage devices, such as a solid state drive (SSD), a multimedia card MMC) in the form of an embedded MMC (eMMC), reduced-size MMC (RS-MMC), and/or micro-MMC, a secure digital (SD) card in the form of a mini-SD, and/or micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-e) card type storage device, a compact flash (CF) card, a smart media card, and/or a memory stick.

The storage device 200 may be manufactured as any of various types of packages. For example, the storage device 200 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

Figure 2:
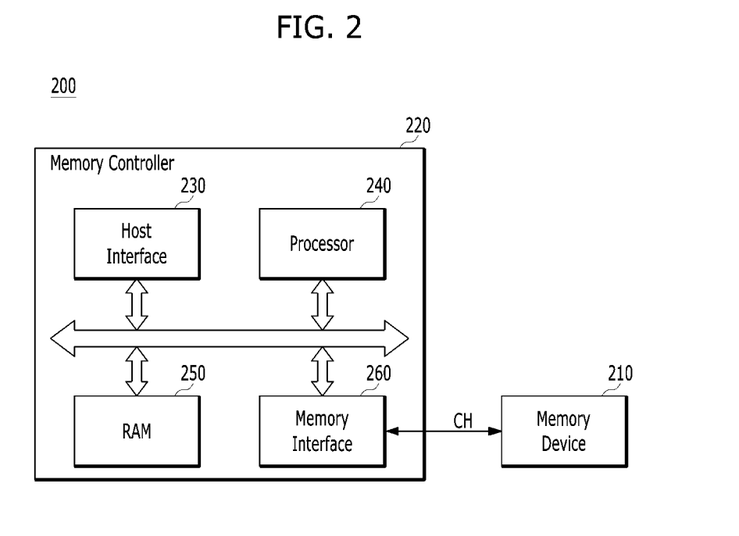
FIG. 2 is a diagram illustrating a configuration of a controller of a storage device according to an embodiment of the present disclosure.
Figure 3:
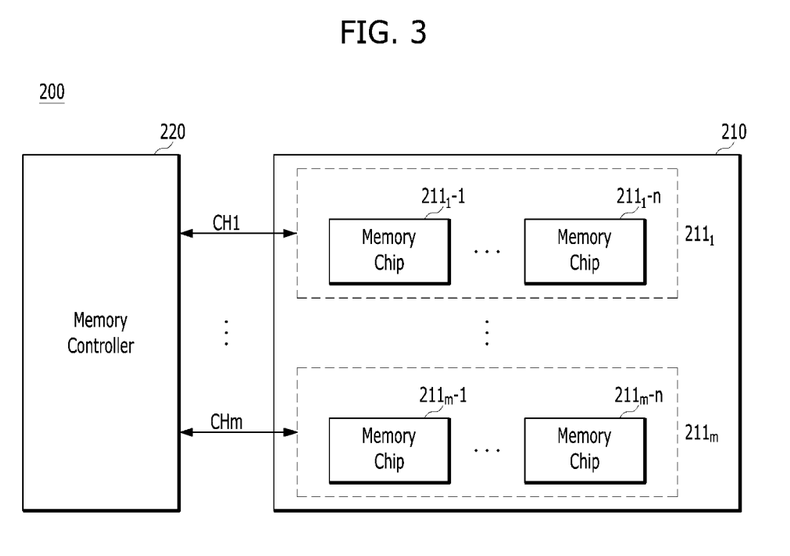
FIG. 3 is a diagram illustrating a configuration of a nonvolatile memory of a storage device according to an embodiment of the present disclosure.

FIGS. 2 and 3 are diagrams illustrating configurations of the storage device 200 according to an embodiment. FIG. 2 is a diagram illustrating a configuration of a controller 220 of the storage device 200, and FIG. 3 is a diagram illustrating a configuration of the nonvolatile memory 210 of the storage device 200.

Referring to FIGS. 2 and 3, the storage device 200 may include the nonvolatile memory 210 and the controller 220.

The nonvolatile memory 210 may be operated as a storage medium of the storage device 200. The nonvolatile memory 210 may include any of various types of nonvolatile memories according to a memory cell, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phasechange random access memory (PRAM) using a chalcogenide alloy, and a resistive random access memory (ReRAM) using a transition metal compound.

The nonvolatile memory 210 may include a memory cell array (not shown) including a plurality of memory cells arranged in regions in which a plurality of word lines (not shown) and a plurality of bit lines (not shown) intersect.

For example, each of the memory cells in the memory cell array may be a single-level cell (SLC) in which a single bit of data is to be stored and an extra-level cell (XLC) in which 2 or more bits of data is to be stored. The XLC may include a multi-level cell (MLC) in which 2 bits of data is to be stored, a triple-level cell (TLC) in which 3 bits of data is to be stored, a quad-level cell (QLC) in which 4 bits of data is to be stored, and the like. The memory cell array may include memory cells arranged in a two-dimensional (2D) horizontal structure or memory cells arranged in a 3D vertical structure.

The controller 220 may control overall operation of the storage device 200 through driving (or execution) of firmware or software loaded into a volatile memory 250. The controller 220 may decode and drive (or execute) a code-type instruction or algorithm such as firmware or software. The controller 220 may be implemented with hardware or a combination of hardware and software.

The controller 220 may include a host interface 230, a processor 240, the volatile memory 250, and a memory interface 260. Although not shown in FIG. 2, the controller 220 may further include an error correction code (ECC) circuit which generates parity information by performing ECC encoding on data provided from the host 100 and performs ECC decoding on data read out from the nonvolatile memory 210 using the parity information.

The host interface 230 may perform interfacing between the host 100 and the storage device 200 according to a protocol of the host 100. For example, the host interface 230 may communicate with the host 100 through any of a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-E protocol.

The processor 240 may be configured as a micro control unit (MCU), a central processing unit (CPU), and the like. The processor 240 may process requests transmitted from the host 100. To process the requests transmitted from the host 100, the processor 240 may drive (or execute) a code-type instruction or algorithm (for example, firmware) loaded into the volatile memory 250 and control internal function blocks such as the host interface 230, the volatile memory 250, and the memory interface 260 and the nonvolatile memory 210.

The processor 240 may generate commands for controlling operations of the nonvolatile memory 210 based on requests transmitted from the host 100 and provide the generated commands to the nonvolatile memory 210 through the memory interface 260.

The volatile memory 250 may be configured as a dynamic random access memory (DRAM) or a static random access memory (SRAM). The volatile memory 250 may store the firmware driven through the processor 240. The volatile memory 250 may also store data (for example, metadata) for driving of the firmware. For example, the volatile memory 250 may be operated as a working memory of the processor 240.

The volatile memory 250 may temporarily store data (for example, write data) to be transmitted from the host 100 to the nonvolatile memory 210 or temporarily store data (for example, read data) to be transmitted to the host 100 from the nonvolatile memory 210. For example, the volatile memory 250 may be operated as a buffer memory.

The memory interface 260 may control the nonvolatile memory 210 according to control of the processor 240. The memory interface 260 may provide the commands generated by the processor 240 to the nonvolatile memory 210. The memory interface 260 may provide the write data temporarily stored in the volatile memory 250 to the nonvolatile memory 210 or may receive the read data from the nonvolatile memory 210 and temporarily store the received read data in the volatile memory 250.

Referring to FIG. 3, the nonvolatile memory 210 may include a plurality of memory chips 211. The plurality of memory chips 211 may be grouped into a plurality of memory chip groups $211_1$ to $211_m$, but the present invention is not limited thereto. Each of the plurality of memory chip groups $211_1$-$211_m$ may include n (where n is a natural number of 1 or more) memory chips $211_1$-1 to $211_1$-n~$211_m$-1 to $211_m$-n. The plurality of memory chip groups $211_1$ to $211_m$ may communicate with the memory controller 220 through channels CH1 to CHm, respectively, (where m is a natural number of 1 or more).

For example, each of the plurality of memory chips $211_1$-1 to $211_1$-n~$211_m$-1 to $211_m$-n in each of the plurality of memory chip groups $211_1$ to $211_m$ may be electrically coupled to the designated channel(s) CH1 to CHm. Memory chips in the same group may be electrically coupled to the same channel. The channels CH1 to CHm may refer to independent buses which transmit and receive commands, addresses, and data to and from the memory chips $211_1$-1 to $211_1$-n~$211_m$-1 to $211_m$-n. Memory chips coupled to different channels may be independently operated.

Figure 4:
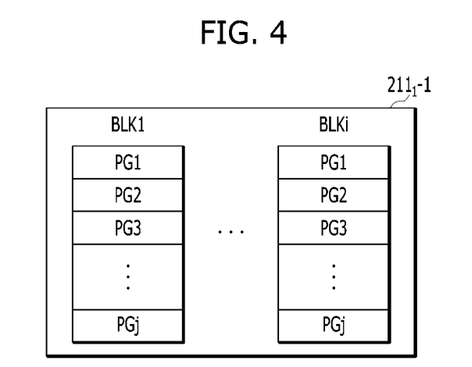
FIG. 4 is a diagram illustrating a configuration of a memory chip, such as that of FIG. 3.

FIG. 4 is a diagram illustrating a configuration of a memory chip of FIG. 3. A first memory chip $211_1$-1 of a first memory chip group $211_1$ is exemplarily illustrated in FIG. 4, with the understanding that each of the remaining memory chips in the nonvolatile memory 210 may have the same configuration as the first memory chip $211_1$-1 illustrated in FIG. 4.

Referring to FIG. 4, the memory chip $211_1$-1 may include a plurality of memory blocks BLK1 to BLKi. Each of the memory blocks BLK1 to BLKi may include a plurality of pages PG1 to PGj. Although not shown in FIG. 4, the memory chip $211_1$-1 may include a plurality of planes, and each of the plurality of planes may include a plurality of memory blocks. For brevity, memory block is sometimes simply referred to as block.

Although not shown in FIG. 4, some of the plurality of memory blocks in the nonvolatile memory 210 may be SLC blocks configured to write data in a SLC mode and other blocks in the nonvolatile memory 210 may be XLC blocks configured to write data in an XLC mode.

The SLC blocks may be used to store write data provided from the host 100 for a short time. For example, the SLC blocks may be used as a buffer. Then, the data stored in the SLC block(s) may be migrated to XLC block(s). For example, when an XLC block is a TLC block capable of storing 3 bits of data in each memory cell, data stored in three physical pages of memory cells coupled to three word lines in an SLC block may be migrated to one physical page of memory cells coupled to one word line of an XLC block. Such a process may refer to data migration or garbage collection for the SLC block.

When data provided from the host 100 is directly stored in an XLC block, write speed may be significantly decreased, and thus write performance may be deteriorated. Accordingly, in an embodiment, the data provided from the host 100 may be promptly stored in an SLC block fast and then that data stored may be migrated to an XLC block.

In general, the maximum number of memory blocks to be used as SLC blocks in the nonvolatile memory 210 may be fixed. Accordingly, when only SLC blocks are used to improve write performance, the number of times that garbage collection for the SLC block(s) is performed may be increased.

In this case, the number of times that garbage collection for the XLC block(s) is performed may be relatively reduced and the number of XLC blocks having a very small number of valid pages may be increased. As a result, free blocks, that is, available XLC blocks may be remarkably reduced. When the number of times that garbage collection for the XLC block(s) is performed is increased to obtain free blocks, the time for processing a request received from the host 100 may be delayed, which may cause deterioration of performance in the storage device 200.

For example, when garbage collection for the SLC block(s) is performed a relatively large number of times, high write performance may be maintained, but the number of free blocks among the XLC blocks may be reduced fast. When garbage collection for the XLC block(s) is performed a relatively large number of times, a large number of free blocks may be obtained within a short time, but obtaining empty SLC blocks may be delayed, and thus the write performance may be deteriorated.

Accordingly, garbage collection for the SLC block(s) and the XLC block(s) has to be performed at an appropriate point so as to prevent the performance deterioration of the storage device 200 while still easily obtaining free blocks.

According to an embodiment, the processor 240 of the controller 220 may count the number of XLC blocks having K (where K is a natural number of 1 or more) or less valid pages among use-completed XLC blocks, perform garbage collection on the SLC block(s) before the number of XLC blocks having K or less valid pages reaches P (where P is a natural number of 1 or more), and perform garbage collection on the XLC block(s) when the number of XLC blocks having K or less valid pages is equal to P. The use-completed may mean that the access operation has been completed. For example, it means that the access operation for XLC blocks has been completed.

Figure 5:
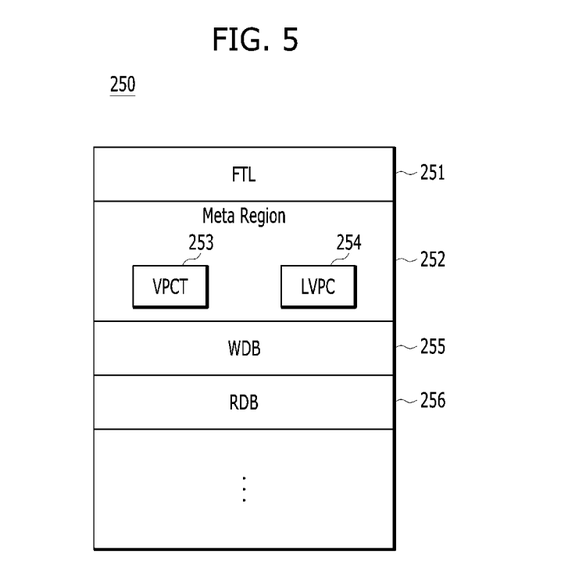
FIG. 5 is a diagram illustrating a configuration of a volatile memory, such as that of FIG. 2.

FIG. 5 is a diagram illustrating a configuration of the volatile memory 250 of FIG. 2.

Referring to FIG. 5, the volatile memory 250 may include a first region 251 in which a flash translation layer FTL is to be stored, a second region 252 used as a meta region in which meta data is to be stored, a third region 255 used as a write data buffer WDB in which write data is to be temporarily stored, a fourth region 256 used as a read data buffer RDB in which read data is to be temporarily stored, and the like. The volatile memory 250 may include other regions used for various other purposes as those skilled in the art will understand.

When the nonvolatile memory 210 is configured as a flash memory, the processor 240 may control an intrinsic operation of the nonvolatile memory 210 and drive (or execute) software called the flash translation layer FTL to provide device compatibility with the host 100. The host 100 may recognize and use the storage device 200 as a general data storage device such as a hard disc drive (HDD) through the driving (or execution) of the flash translation layer FTL. The flash translation layer FTL may include modules configured to perform various functions and meta data for driving the modules. The flash translation layer FTL may be stored in a system region (not shown) of the nonvolatile memory 210, and when the storage device 200 is powered on, the flash translation layer FTL may be read from the system region of the nonvolatile memory 210 and stored in the first region 251 of the volatile memory 250.

Figure 6:
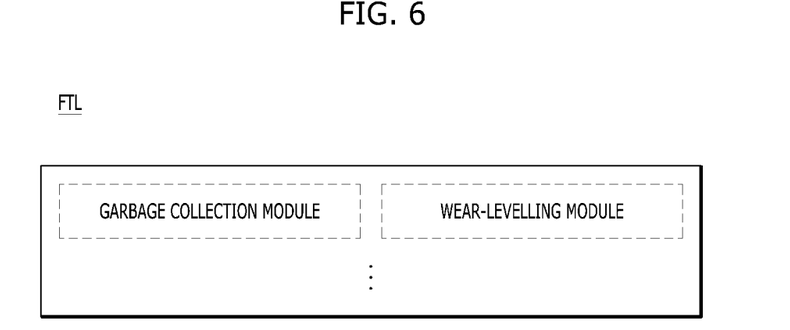
FIG. 6 is a diagram illustrating a configuration of a flash translation layer (FTL) according to an embodiment of the present disclosure.

FIG. 6 is a diagram illustrating a configuration of a flash translation layer FTL according to an embodiment.

Referring to FIG. 6, the flash translation layer FTL may include a garbage collection module GCM, a wear-levelling module (WLM), and the like, but the FTL is not limited to that specific configuration. For example, the flash translation layer FTL may further include a write module, a read module, a bad block management module, an address map, and the like.

The garbage collection module GCM may collect valid data distributed among, and stored in, memory blocks of the nonvolatile memory 210 in one memory block and manage the nonvolatile memory 210 and the volatile memory 250 to perform an erase operation on the invalid data.

The nonvolatile memory 210 configured as a flash memory may not support data overwrite due to a structural characteristic. This is because when data is overwritten in a memory cell in which data has been stored, reliability of the data stored in the corresponding memory cell cannot necessarily be ensured or maintained. Accordingly, in order to write data in a memory cell in which data has been stored, an erase operation on that memory cell has to be performed before such write operation.

Since the erase operation on the nonvolatile memory 210 is performed in memory block units, it takes a considerably long time to perform the erase operation. Accordingly, when a memory cell corresponding to a write address is in a written state, the processor 240 may not perform an erase/write operation on the corresponding memory cell but may write data in another memory cell in an empty state. In this case, the original data stored in the memory cell corresponding to the write address may be old data that is regarded as invalid and the data stored in the other memory cell may be the latest data that is regarded valid.

Accordingly, valid data and invalid data are mixed within the blocks of the nonvolatile memory 210. If necessary, for example, when the number of free blocks is equal to or less than a threshold value, the processor 240 may drive (or execute) the garbage collection module GCM to select a memory block having a relatively small amount of valid data (or the least valid data among memory blocks) as a victim block (source block) and perform garbage collection which migrates the valid data in the victim block to another memory block (destination block). Accordingly, the source block may be classified as a free block in which only invalid data exists. The free block may refer to an available memory block.

Referring back to FIG. 5, a valid page count table (VPCT) 253 is configured to store the number of valid pages for each of the plurality of memory blocks in the nonvolatile memory 210 and a low valid page counter (LVPC) 254 is configured to store the number of memory blocks having K or less valid pages. Both VPCT 253 and LVPC 254 may be stored in the meta region 252 of the volatile memory 250.

The VPCT 253 and the LVPC 254 may be generated by the processor 240. Values stored in the VPCT 253 and the LVPC 254 may be updated whenever a map updating operation is performed.

For example, the processor 240 may confirm or calculate the number of valid pages in each memory block of the nonvolatile memory 210 and store or update those numbers in respective locations in the VPCT 253. That is, the VPCT 253 may have locations respectively corresponding to the memory blocks for maintaining their valid page counts. Further, the processor 240 may confirm the number of XLC blocks having K (where K is a natural number of 1 or more) or less valid pages by referring to the VPCT 253 and update the value stored in the LVPC 254 with the confirmed value.

The processor 240 may determine whether or not a garbage collection trigger condition for the nonvolatile memory 210 is satisfied. For example, when the number of free blocks in the nonvolatile memory 210 is equal to or less than a threshold value, the processor 240 may determine that the garbage collection trigger condition is satisfied. Here, a free block may refer to an available block among the XLC blocks, for example, a block in which data is not stored.

In another embodiment, when a size of data written in the nonvolatile memory 210 in response to a request of the host 100 is equal to or larger than a threshold value, the processor 240 may determine that the garbage collection trigger condition is satisfied. In another embodiment, when a time during which no request is received from the host 100, that is, an idle time, is equal to or larger than a threshold value, the processor 240 may determine that the garbage collection trigger condition is satisfied. Other conditions may also be used to trigger garbage collection.

When it is determined that the garbage collection trigger condition is met, the processor 240 may determine whether or not the number of XLC blocks having K or less valid pages is equal to or larger than P (where P is a natural number of 1 or more). For example, the controller 220 may determine whether or not the number of XLC blocks having K or less valid pages is equal to or larger than P by comparing P with the value stored in the LVPC 254 in the meta region 252 of the volatile memory 250.

When the number of XLC blocks having K or less valid pages is equal to or larger than P, the processor 240 may select a victim block among the XLC blocks having K or less valid pages and perform garbage collection on the selected victim block. For example, the controller 220 may select a XLC block having the smallest number of valid pages among the XLC blocks having K or less valid pages as the victim block, but the invention is not limited thereto.

When the number of XLC blocks having K or less valid pages is less than P, the processor 240 may select a victim block among the SLC blocks in which data (for example, write data) are stored and perform garbage collection on the selected victim block. For example, the processor 240 may perform garbage collection on the SLC block by migrating the data stored in the SLC block selected as the victim block to an XLC block.

As described above, according to an embodiment, before a determined number (for example, P) XLC blocks having a determined number of (for example, K) valid pages or more are present, the garbage collection (that is, migration) on the SLC block may be performed to increase the write speed, and when the number of XLC blocks having a determined number (for example, K) or more valid pages is equal to or larger than the determined number (for example, P), the garbage collection on the XLC block may be performed to ensure a sufficient supply of free blocks. Therefore, while maintaining high write performance, at least a fixed number of free blocks may be easily maintained.

Figure 7:
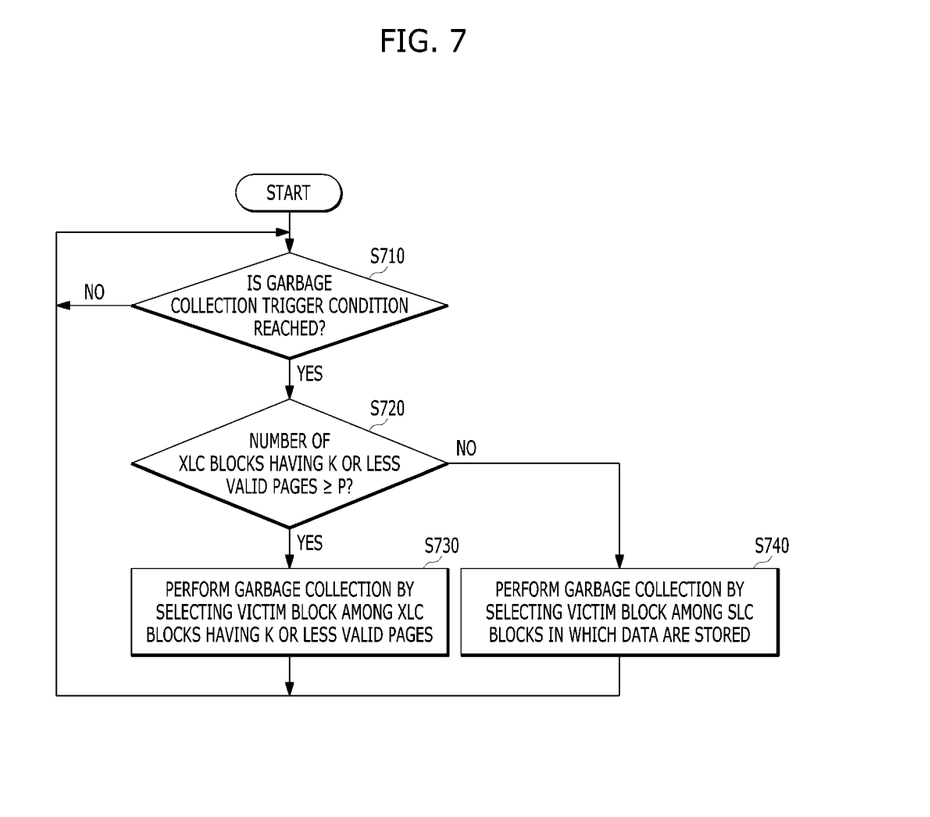
FIG. 7 is a flowchart illustrating an operating method of a storage device according to an embodiment of the present disclosure.

FIG. 7 is an operating method of the storage device 200 according to an embodiment. The operating method of the storage device 200 according to an embodiment is primarily described with reference to FIG. 7, with secondary reference to FIGS. 2 to 6. In operation S710, the controller 220 may determine whether or not a garbage collection trigger condition for the nonvolatile memory 210 is reached, i.e., satisfied. For example, when the number of free blocks in the nonvolatile memory 210 is equal to or less than a threshold value, the controller 220 may determine that the garbage collection trigger condition is satisfied. In another embodiment, when a size of data written in the nonvolatile memory 210 in response to a request of the host 100 is equal to or larger than a threshold value, the controller 220 may determine that the garbage collection trigger condition is satisfied. In another embodiment, when the time during which no request is received from the host 100, that is, an idle time, is equal to or larger than a threshold value, the controller 220 may determine that the garbage collection trigger condition is satisfied. In addition, various other garbage collection conditions may be used to trigger garbage collection.

When it is determined that the garbage collection trigger condition is satisfied, the controller 220 may proceed to operation S720. When it is determined that the garbage collection trigger condition is not satisfied, the controller 220 may continue with operation S710. Operation S710 may be repeatedly performed until the garbage collection trigger condition is satisfied.

In operation S720, the controller 220 may determine whether or not the number of XLC blocks having K or less valid pages is equal to or larger than P. For example, the controller 220 may determine whether or not the number of XLC blocks having K or less valid pages is equal to or larger than P by comparing P with the value stored in the LVPC 254 in the meta region 252 of the volatile memory 250.

When it is determined that the number of XLC blocks having K or less valid pages is equal to or larger than P, the controller 220 may proceed to operation S730. When it is determined that the number of XLC blocks having K or less valid pages is less than P, the controller 220 may proceed to operation S740.

In operation S730, the controller 220 may select a victim block among the XLC blocks having K or less valid pages and perform garbage collection on the selected victim block. For example, the controller 220 may select a XLC block having the smallest number of valid pages among the XLC blocks having K or less valid pages, as the victim block, but the invention is not limited thereto.

In operation S740, the controller 220 may select a victim block among the SLC blocks in which data (for example, write data) are stored and perform garbage collection on the selected victim block. For example, the controller 220 may perform garbage collection on the SLC block by migrating the data stored in the SLC block selected as the victim block to an XLC block.

Figure 8:
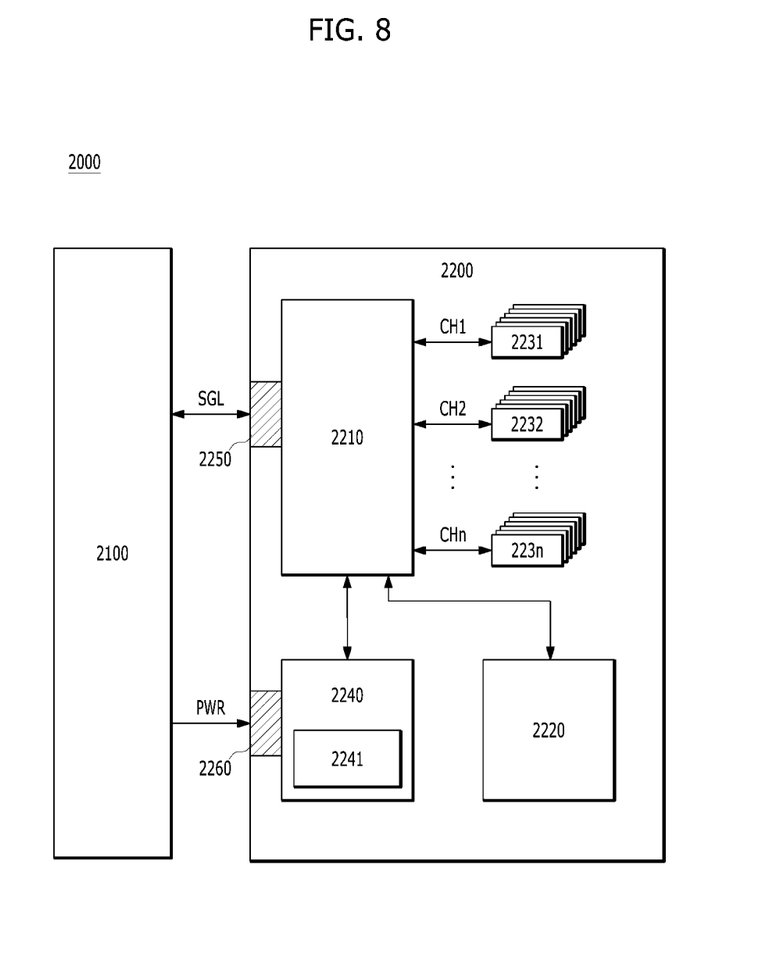
FIG. 8 is a diagram illustrating a data processing system including a solid state drive (SSD) in accordance with an embodiment.

FIG. 8 is a diagram illustrating a data processing system including a solid state drive (SSD) in accordance with an embodiment. Referring to FIG. 8, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn, respectively. One or more nonvolatile memory devices may be coupled to one channel. The nonvolatile memory devices coupled to the same channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be any of various types of connectors according to an interfacing method between the host apparatus 2100 and the SSD 2200.

Figure 9:
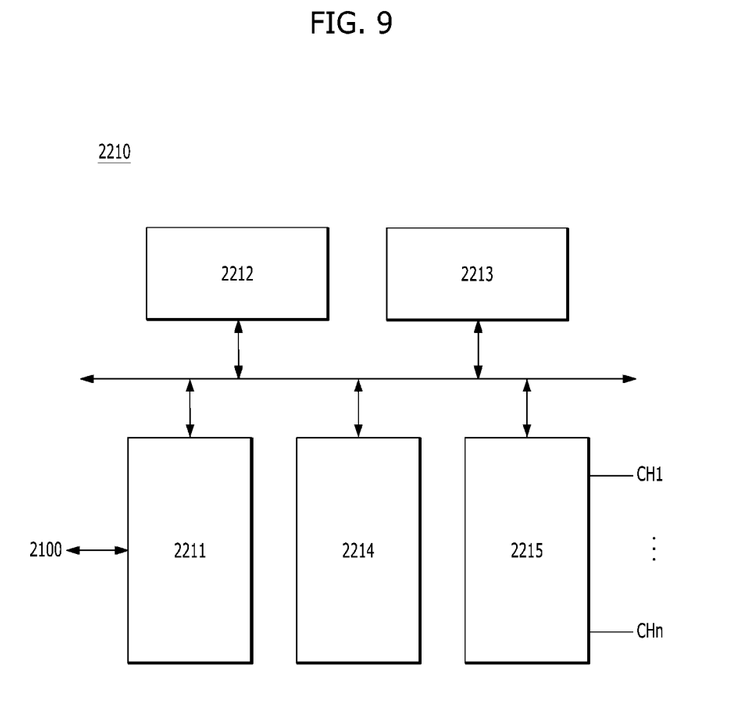
FIG. 9 is a diagram illustrating a controller, such as that illustrated in FIG. 8.

FIG. 9 is a diagram illustrating the controller 2210 of FIG. 8. Referring to FIG. 9, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI express (PCI-e) protocol, and a universal flash storage (UFS) protocol. The host interface 2211 may perform a disc emulation function so that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors in data read from the nonvolatile memory devices 2231 to 223n based on the parity data. When the number of detected errors is within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 10:
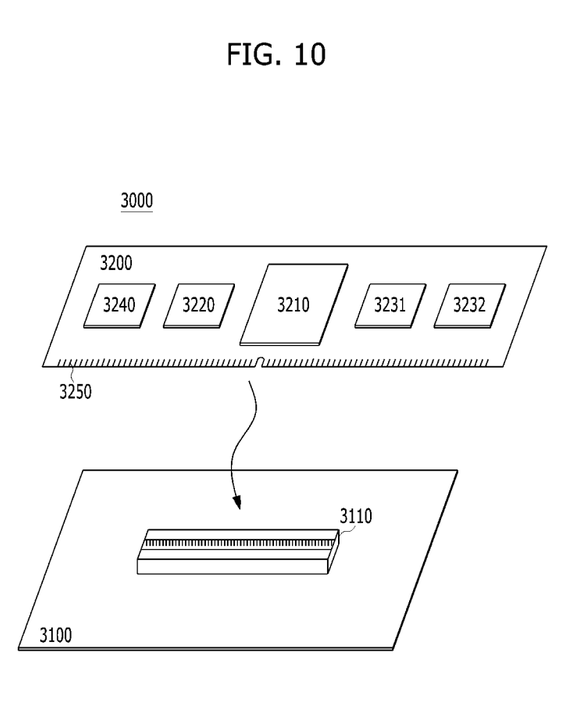
FIG. 10 is a diagram illustrating a data processing system including a data storage apparatus in accordance with an embodiment.

FIG. 10 is a diagram illustrating a data processing system including a data storage apparatus in accordance with an embodiment. Referring to FIG. 10, a data processing system 3000 may include a host apparatus 3100 and a data storage apparatus 3200.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured the same as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in any of various forms according to an interfacing method between the host apparatus 3100 and the data storage apparatus 3200. The connection terminal 3250 may be arranged in or one any side of the data storage apparatus 3200.

Figure 11:
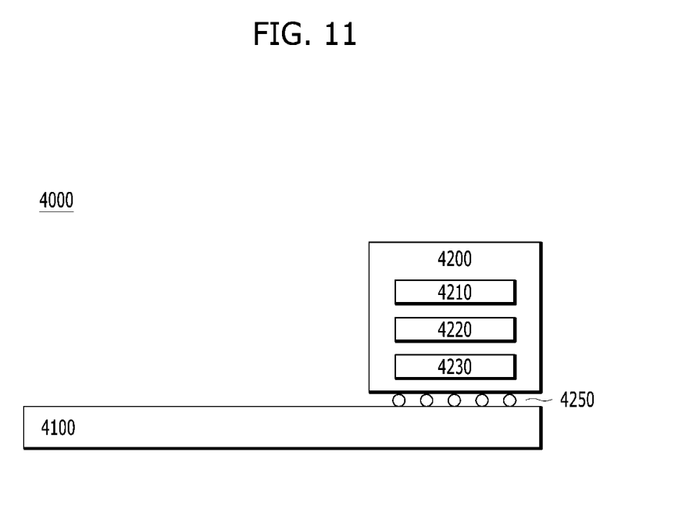
FIG. 11 is a diagram illustrating a data processing system including a data storage apparatus in accordance with an embodiment.

FIG. 11 is a diagram illustrating a data processing system including a data storage apparatus in accordance with an embodiment. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured the same as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 12:
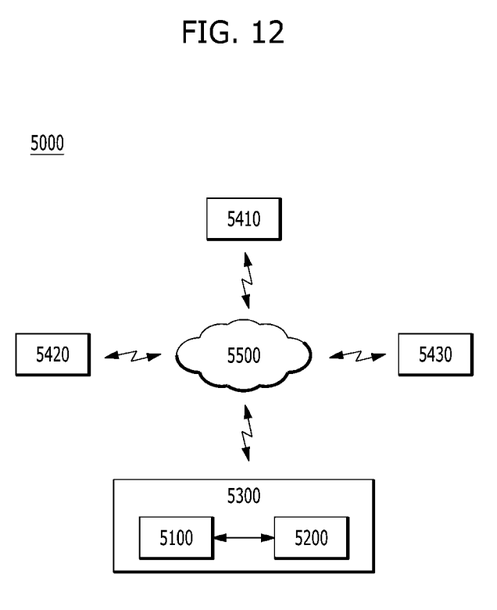
FIG. 12 is a diagram illustrating a network system including a data storage apparatus in accordance with an embodiment.

FIG. 12 is a diagram illustrating a network system 5000 including a data storage apparatus in accordance with an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured as the storage device 200 of FIG. 1, the SSD 2200 of FIG. 8, the data storage apparatus 3200 of FIG. 10, or the data storage apparatus 4200 of FIG. 11.

Figure 13:
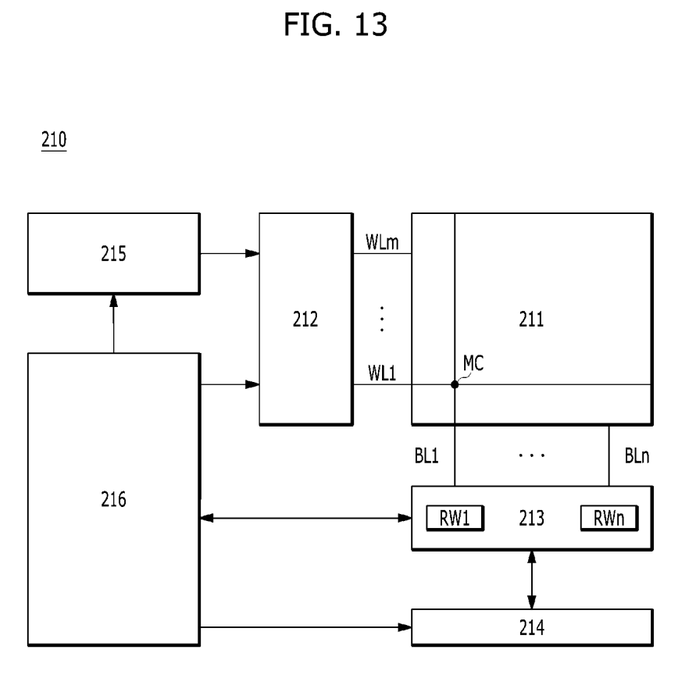
FIG. 13 is a diagram illustrating a nonvolatile memory device included in a data storage apparatus in accordance with an embodiment.

FIG. 13 is a diagram illustrating a nonvolatile memory device included in a data storage apparatus in accordance with an embodiment. Referring to FIG. 13, a nonvolatile memory device 210 may include a memory cell array 211, a row decoder 212, a column decoder 214, a data read/write block 213, a voltage generator 215, and control logic 216.

The memory cell array 211 may include memory cells MC arranged in regions in which word lines WL1 to WLm and bit lines BL1 to BLn cross to each other.

The row decoder 212 may be coupled to the memory cell array 211 through the word lines WL1 to WLm. The row decoder 212 may operate through control of the control logic 216. The row decoder 212 may decode an address provided from an external apparatus (not shown). The row decoder 212 may select and drive the word lines WL1 to WLm based on a decoding result. For example, the row decoder 212 may provide a word line voltage provided from the voltage generator 215 to the word lines WL1 to WLm.

The data read/write block 213 may be coupled to the memory cell array 211 through the bit lines BL1 to BLn. The data read/write block 213 may include read/write circuits RW1 to RWn corresponding to the bit lines BL1 to BLn. The data read/write block 213 may operate according to control of the control logic 216. The data read/write block 213 may operate as a write driver or a sense amplifier according to an operation mode. For example, the data read/write block 213 may operate as the write driver configured to store data provided from an external apparatus in the memory cell array 211 in a write operation. In another example, the data read/write block 213 may operate as the sense amplifier configured to read data from the memory cell array 211 in a read operation.

The column decoder 214 may operate though control of the control logic 216. The column decoder 214 may decode an address provided from an external apparatus (not shown). The column decoder 214 may couple the read/write circuits RW1 to RWn of the data read/write block 213 corresponding to the bit lines BL1 to BLn and data input/output (I/O) lines (or data I/O buffers) based on a decoding result.

The voltage generator 215 may generate voltages used for an internal operation of the nonvolatile memory device 210. The voltages generated through the voltage generator 215 may be applied to the memory cells of the memory cell array 211. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 216 may control overall operation of the nonvolatile memory device 210 based on a control signal provided from an external apparatus. For example, the control logic 216 may control an operation of the nonvolatile memory device 210 such as a read operation, a write operation, an erase operation of the nonvolatile memory device 210.

The above described embodiments of the present invention are intended to illustrate, not limit, the present invention. Various alternatives and equivalents are possible. The invention is not limited by the embodiments described herein. Nor is the invention limited to any specific type of semiconductor device. Those skilled in the art will understand that other additions, subtractions, or modifications are possible in view of the present disclosure. The present invention encompasses all such variations that fall within the scope of the appended claims.

What is claimed is:

1. A storage device comprising:
   a nonvolatile memory including a plurality of first blocks having memory cells each configured to store one bit of data and a plurality of second blocks having memory cells each configured to multiple bits of data; and
   a controller configured to determine whether or not a number of use-completed second blocks, each of which has a first threshold number or less of valid pages, among use-completed second blocks of the plurality of second blocks, is equal to or larger than a second threshold number, to select, according to a determination result, a victim block on which garbage collection is to be performed among used-completed first blocks of the plurality of first blocks or the use-completed second blocks each having the first threshold number or less of valid pages, and to perform the garbage collection on the selected victim block.

2. The storage device of claim 1, wherein the plurality of first blocks include single-level cell (SLC) blocks, and the plurality of second blocks include extra-level cell (XLC) blocks.

3. The storage device of claim 1, wherein the controller selects the victim block on which the garbage collection is to be performed among the use-completed first blocks when the number of use-completed second blocks, each having the first threshold number or less of valid pages, is less than the second threshold number.

4. The storage device of claim 3, wherein the controller performs the garbage collection on the selected victim block by migrating all data stored in the selected victim block to at least one of the second blocks.

5. The storage device of claim 1, wherein the controller selects the victim block on which the garbage collection is to be performed among the use-completed second blocks, each having the first threshold number or less of valid pages, when the number of the use-completed second blocks, each having the first threshold number or less of valid pages, is equal to or larger than the second threshold number.

6. The storage device of claim 5, wherein the controller performs the garbage collection on the selected victim block by migrating data stored in the valid pages of the selected victim block to another second block.

7. The storage device of claim 6, wherein the another second block is one of a second block being currently used and a non-used second block.

8. The storage device of claim 1, wherein the controller counts the number of second blocks each having the first threshold number or less of valid pages, based on the number of valid pages in each of the use-completed second blocks and compares the number of counted second blocks with the second threshold number.

9. An operating method of a storage device which includes a nonvolatile memory including a plurality of first blocks having memory cells each configured to store one bit of data and a plurality of second blocks having memory cells each configured to store multiple bits of data and a controller configured to control the nonvolatile memory, the method comprising:
determining whether or not a garbage collection trigger condition for the nonvolatile memory is satisfied;
determining whether or not a number of use-completed second blocks, each of which has a first threshold number or less of valid pages, among use-completed second blocks of the plurality of second blocks, is equal to or larger than a second threshold number;
selecting, according to a determination result for the number of use-completed second blocks, a victim block on which garbage collection is to be performed among used-completed first blocks of the plurality of first blocks or the use-completed second blocks each having the first threshold number or less of valid pages, and performing the garbage collection on the selected victim block.

10. The method of claim 9, wherein the plurality of first blocks include single-level cell (SLC) blocks, and the plurality of second blocks include extra-level cell (XLC) blocks.

11. The method of claim 9, wherein the selecting of the victim block on which the garbage collection is to be performed includes selecting the victim block on which garbage collection is to be performed among the use-completed first blocks when the number of use-completed second blocks, each having the first threshold number or less of valid pages, is less than the second threshold number.

12. The method of claim 11, wherein the performing of the garbage collection includes performing the garbage collection on the selected victim block by migrating all data stored in the selected victim block to at least one of the second blocks.

13. The method of claim 9, wherein the selecting of the victim block on which the garbage collection is to be performed includes selecting the victim block on which the garbage collection is to be performed among the use-completed second blocks each having the first threshold number or less of valid pages, when the number of the use-completed second blocks, each having the first threshold number or less of valid pages, is equal to or larger than the second threshold number.

14. The method of claim 13, wherein the performing of the garbage collection includes performing the garbage collection on the selected victim block by migrating data stored in the valid pages of the selected victim block to another second block.

15. The method of claim 14, wherein the another second block is one of a second block being currently used and a non-used second block.

16. The method of claim 9, further comprising counting the number of second blocks each having the first threshold number or less of valid pages, based on the number of valid pages in each of the use-completed second blocks.

17. The method of claim 16, wherein the determining whether or not the number of use-completed second blocks, each having the first threshold number or less of valid pages, is equal to or larger than the second threshold number includes comparing the number of counted second blocks with the second threshold number.

18. A storage device comprising:
a nonvolatile memory including a plurality of single-level cell (SLC) blocks and a plurality of extra-level cell (XLC) blocks; and
a collector configured to select a victim block on which garbage collection is to be performed among the plurality of SLC blocks or among the plurality of XLC blocks, based on a number of use-completed XLC blocks each having K or less valid pages among use-completed XLC blocks of the plurality of XLC blocks, wherein K is a natural number of 1 or more, and to perform the garbage collection on the selected victim block.

19. The storage device of claim 18, wherein, when the number of use-completed XLC blocks each having K or less valid pages is less than P, the controller performs the garbage collection by selecting a use-completed SLC block among the plurality of SLC blocks as the victim block, wherein P is a natural number of 1 or more.

20. The storage device of claim 18, wherein, when the number of use-completed XLC blocks each having K or less valid pages is equal to or larger than P, the controller performs the garbage collection by selecting the victim block among the use-completed XLC blocks having K or less valid pages, wherein P is a natural number of 1 or more.

* * * * *